United States Patent [19]

Schaefer

[11] 4,016,326
[45] Apr. 5, 1977

[54] LAYER COMPOSITION

[76] Inventor: Helmut Schaefer, Via Bernini I, Cerro Maggiore, Italy

[22] Filed: Apr. 1, 1975

[21] Appl. No.: 563,976

[30] Foreign Application Priority Data

Apr. 12, 1974 Italy .................................. 21427/74

[52] U.S. Cl. ................................ 428/306; 428/327; 428/403; 428/425; 428/473

[51] Int. Cl.[2] ...................... B32B 3/26; B32B 5/18

[58] Field of Search .......... 428/425, 307, 151, 159, 428/403, 404, 160, 218, 306, 327, 904, 405, 473; 427/245, 307

[56] References Cited

UNITED STATES PATENTS

| 3,615,974 | 10/1971 | Morehouse, Jr. .................. 428/307 |
| 3,864,181 | 2/1975 | Wolinski et al. ..................... 156/79 |

Primary Examiner—William J. Van Balen
Attorney, Agent, or Firm—Ernest G. Montague; Karl F. Ross; Herbert Dubno

[57] ABSTRACT

A layer composition, which may be used for making shoes, upholstery or the like, comprising a carrier layer and a cover layer adhering thereto. The cover layer essentially consists of a synthetic resin material which bubbles are imbedded. The shells of the bubbles consists of a thermoplastic synthetic resin material other than the material of the cover layer. Preferably the shell of the bubbles consists of an elastic copolymer of polyvinylidene chloride and/or of a copolymer of polyvinyl chloride. The bubbles are bonded to the material of the cover layer and have hollow cores containing a gas, preferably air. The volume of the hollow cores amounts to at least 25%, preferably 50 to 85%, of the total volume of the cover layer.

7 Claims, 1 Drawing Figure

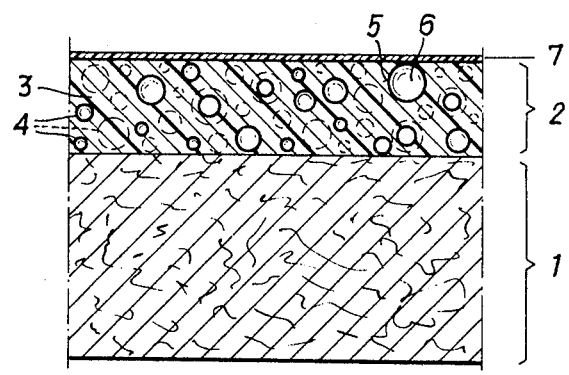

LAYER COMPOSITION

The present invention relates to a layer leather composition, having a split leather carrier layer and a cover layer bonded thereto.

Cover layers applied to a carrier layer in form of an aqueous dispersion of synthetic resins, particularly dispersions of elastomers, are already known. Such cover layers applied to a carrier layer are most often used as materials for the production of shoes, for upholstery or the like. Such materials are required to have good mechanical properties even when wet. Furthermore, such materials should be of light weight, to give a warm, dray and agreeable feeling, to be impermeable to water vapor and to be capable of being produced with lost cost. Finally, such cover layers should conceal the structure of the base material such that this structure will not become visible at the surface under tension stress.

It is known to produce cover layers adapted to resist mechanical stress from dispersions of polyurethanes or modified polyurethanes (German published Patent Applications Nos. 1,943,975 and 2,146,889, French Patent Specification No. 2,007,794).

It is further known to produce microporous cover layers from dispersions of polyurethanes by simultaneously using nonspherical substances insoluble in tetrahydrofuran (U.S. Pat. No. 3,662,527). It is further known to produce pores within cover layers produced from dispersions of polyurethanes by incorporating into such dispersions fibrous substances (German published Patent Application No. 2,035,730). It has also been proposed to produce porous cover layers by selectively evaporating solvents from dispersions of polyurethanes (Japanese Patent Application No. 19623/72).

It is further known to produce microporous cover layers essentially consisting of polyurethanes from dispersions by coagulation of and/or removing by washing solid or liquid substances (British Patent Specification No. 1,220,218).

The known processes are suitable for producing thin, compact and more or less homogeneous cover layers having a high density and good mechanical properties and, in some cases, for producing microporous cover layers having a somewhat sponge-like foam structure with open cells. However the known cover layers are subjected to significant variation in their physical properties and have quite poor mechanical properties under wet conditions. A further drawback of known cover layers is that in applying such cover layers to coarse carrier substrates produced by a splitting step, such as for instance split leather, thick, and therewith heavy and expensive cover layers have to be applied to avoid carrying over the appearance of the structure of the carrier layer to the face of the finished product. Reproducibility of a uniform porosity can be achieved only with difficulty with thick cover layers. Furthermore, thick cover layers produced of dispersions of polyurethanes are quite uneconomical because of high material consumption.

It is an object of the present invention to avoid the disadvantages of known cover layers and to provide a cover layer on a carrier layer which can be easily produced, which is of light weight and which has a soft and has a dry, warm and agreeable feeling.

It is a further object of the invention to provide a cover layer which has a wrinkled surface similar to the natural grain of leather when it is bent or compressed and which has good mechanical properties even in a wet condition and which is permeable by water vapor.

The invention essentially consists in that the cover layer comprises synthetic resin layer material having imbedded therein bubbles consisting of a thermoplastic synthetic resin shell material and a hollow core, said shell material differing from the synthetic resin layer material. The hollow core of each such bubble contains a gas. The volume of the hollow cores is at least 25% of the total volume of the cover layer. The shell consists of an elastic copolymer of polyvinylidene chloride. The gas is preferably air, but other gaseous mediums can be used. The total volume of the hollow cores is preferably 50 to 85% of the total volume of the cover layer.

It is of advantage to make the cover layer from aqueous dispersions which form, after evaporation of water therefrom at a temperature below 140° C, films or foils having a hardness of 10 to 90 Shore A, preferably 25 to 55 Shore A, and an elongation (at rupture) of more than 120% as determined by the German industrial standard DIN 53445. Also mixtures of dispersions may be used. The term "aqueous dispersion" is intended to include not only those liquid film formers which are classified as colloids or are emulsions but also those liquid film formers based on synthetic resin material which, without detracting from the mechanical properties of the finally obtained films, contain or may contain within their liquid phase more than 1% of water.

Thus the cover layer according to the invention consists, based on its total volume, for the major part of an inexpensive substance, i.e. a gas, preferably air, enclosed within the cover layer, so that the amount of resin material for producing the cover layer can be substantially reduced. Thus it is possible to produce cover layers of low specific weight in an economic manner at low cost and with a minimum amount of the synthetic resin material. Because of the gas enclosed within the cover layer the weight of the cover layer can be substantially reduced without detracting from the mechanical properties of this cover layer, since the closed shell of the bubbles containing the gas is strongly connected with the dispersion of the synthetic plastics material and the interstices between the bubbles are nearly completely filled by the dispersion of synthetic resin material. The gas enclosed within the cover layer has the further effect of imparting an agreeable, warm and soft feeling to the cover layer and elastic properties to the cover layer which make this cover layer reversibly compressible. Thus, upon bending of the cover layer, the cover layer will develop a wrinkled surface like leather, and the gas enclosed within the bubbles cannot escape even with frequent bending. A further advantage of a cover layer will, because of its long content of emulsifiers and thickeners, absorb substantially less water than, for example, cover layers of the same thickness and the same density and produced by mechanically or chemically foaming dispersions of the same synthetic resin material and thus cannot swell and will have better mechanical properties even when wet.

According to the invention, the bubbles can have a diameter from 0.009 mm to 0.6 mm, preferably 0.01 to 0.06 mm. Such bubbles impart to the cover layer a microcell structure which will substantially increase its permeability to water vapor. Cover layers with a microcell structure have the further advantage that they do not contain practically any plasticizers or other volatile substances which are required for soft-foam cover layers produced, for example, from plastisols, and which substances are quite disturbing.

According to a further feature of the invention the shells of the bubbles are only loosely connected to the synthetic resin base or matrix material of the cover layer. This also increases the permeability of the cover layer to water vapor and air so that the cover layer will have excellent porosity. The bubbles act like compressible ball joints and, particularly with a moving wearer, promotes the permeability for water vapor contacting the carrier layer, which is of particular advantage for shoes. Such a loose connection of the bubbles is primarily made possible by the smooth bubble surface which is formed by stretching of the shells upon production of the bubbles, so that the anchoring of the bubbles within the dispersions of synthetic resin material by means of adhesive forces only is low.

It is possible to apply to the surfaces of the bubbles a very thin separating agent or anti-adhesive layer, for example a layer of strongly diluted polysiloxane or derivatives of fatty acids and fatty alcohols, so that the bond between the bubbles and the film-forming synthetic resin material in which the bubbles are imbedded, will be less firm and the permeability to water vapor will be further improved.

According to the invention, the arrangement may be such that the volume of gas is lower at least at a surface region of the cover layer than at the central region thereof. The mechanical strength of this portion of the cover layer is increased.

The carrier layer is, according to the invention, formed of split leather, so that no further layer need be applied to the cover layer. According to other embodiments of the invention, for producing the layer composition, a supporting layer, for example of coherent fiber or leather may be applied to the side of the cover layer opposite the carrier layer. The surface of the carrier layer may be provided with embossing and/or with a color finish.

In those cases in which a supporting layer is used in addition to the carrier layer, the supporting layer conveniently consists of a removable base layer which is removed after applying the carrier layer.

If desired, the cover layer may have a multiple layer structure.

The process for applying the cover layer to a carrier layer or substrate is characterized in that bubbles, preferably in an amount of 0.3 to 6.5 parts by weight, provided with a shell of a thermoplastic synthetic resin material, particularly an elastic copolymer of polyvinylidene chloride and/or a copolymer of polyvinyl chloride, and, respectively, or particles of a thermoplastic synthetic resin material, particularly particles of a copolymer, having incorporated an inflating (blowing) agent are distributed in an aqueous dispersion of a synthetic plastics material and the mixture obtained is applied to the carrier layer and subsequently dried, preferably under heat. The mixture may, for example, be spread on the carrier layer by means of a doctor blade, by means of a spreading roller or by means of a spraying nozzle. When preformed bubbles are used, these bubbles are simply distributed within the aqueous dispersion of synthetic resin material. When I use copolymer particles containing a blowing agent the bubbles are formed by the heat applied for drying the mixture. It is also possible to incorporated within the aqueous dispersion of synthetic resin material preformed bubbles as well as copolymer particles containing a blowing agent which is particularly of advantage if the volume occupied by the bubbles must be very great when compared with the volume of the matrix of the synthetic resin material of the finally obtained cover layer. For thoroughly heating the mixture applied to the carrier layer, which is necessary particularly when using copolymer particles containing a blowing agent and forming closed bubbles having a thin shell and a gas enclosed with the shell upon heating, the mixture is exposed to infrared radiation.

Drying of the mixture applied to the carrier layer is conveniently effected under vacuum, for instance within a vacuum dryer, whereby the water is removed by passing through the carrier layer. In this manner, an intimate bond between the cover layer and the carrier layer may be obtained at the same time.

As already mentioned, the carrier layer may for instance consist of bonded leather or fiber materials. According to a further feature of the process according to the invention a supporting layer is applied to the surface of the cover layer opposing the carrier layer. This supporting layer during production of the cover layer serves as a base material or substrate which supports the material of the cover layer during the manufacturing of the layer composition. After completing the layer composition, the supporting layer may be removed from the cover layer.

For producing the layer composition, it is of advantage to subject the surface of the cover layer opposite the carrier layer to a pressing and/or heating step, for instance by means of a heated embossing plate. This gives this surface of the cover layer under heat and pressure a higher density and this surface can at the same time be provided with a finish (for example of a homogeneous material such as polyurethane) and/or an embossed pattern.

In those cases in which a separate supporting layer or finishing layer is to be applied to the cover layer, the cover layer is separated subsequently from the supporting layer. The finishing layers have, as a rule, a thickness of less than 0.08 mm and preferably consist of elastomers.

From the above it is evident that for producing a composition layer according to the invention there are substantially two possibilities:

A. On a supporting layer, for instance of silicone-coated paper, at first a finish layer and then the cover layer and then the carrier layer are applied. The layer application is done always such that a wet substance is applied to a dry layer. Therefore, the wet finish layer is dried. Then the wet cover layer material is applied onto the dry finish layer; after drying of the cover layer, the carrier layer, for instance consisting of a chrome leather is applied. After the individual layers have been applied and dried, the supporting layer is removed, which can easily be done by tearing off the supporting layer from the other layers. This can be facilitated by using a suitable material for the supporting layer. Silicone-coated materials, and glass are anti-adhesive with respect to the materials used for the other layers so that the separation can easily be done.

B. In the other technique the cover layer is applied to the carrier layer which for instance consists of chrome leather and remains always bonded to the cover layer. Then the finish layer is applied to the cover layer. Also within this method the layers are applied in wet condition onto the dry layer.

However, it is also possible to apply a dry layer on a wet material forming another layer within both above-mentioned methods.

The thickness ratio of the layers may be varied. The thickness of the carrier layer or substrate may be between 0.15 mm (for textile materials) and 2.1 mm (for leather). A preferred value is about 1 mm. The thickness of the cover layer may vary between 0.1 mm and 1.1 mm. A preferred value is 0.3 mm. The thickness of the finish layer is substantially less and in some cases is less than 0.08 mm.

As already mentioned, suitable aqueous dispersions of synthetic resin material are all those liquid film formers based on synthetic resin material, which contain or may contain within their liquid phase more than 1% water. Also mixtures of dispersions which are normally unsuitable for embossing can be given a permanent embossing under the action of heat and pressure because of the thermoplastic shells of the bubbles simultaneously used.

The carrier layer used can be formed of plate-like members or of belts, particularly endless belts, which allows continuous production.

In the following, two examples are given for the production of a layer composition comprising a cover layer applied to a carrier layer.

EXAMPLE 1

45 g of a copolymer of polyvinyl chloride in form of small particles which contain a chlorinated hydrocarbon as a blowing agent making the bubbles are added to 1.5 kg of a polyurethane dispersion having a solids content of 58% at room temperature. The mixture is stirred. Subsequently 1.5 g of a water-soluble coloring agent and 60 g silicate powder are added and stirred forming a thickening agent. The mixture is spread by means of a nozzle onto a chrome leather layer constituting the carrier layer and having a thickness of 1.2 mm. The thickness of the aqueous dispersion constituting the cover layer is about 0.11 mm. Next the wet cover layer is heated by infrared radiation to 95° C whereby bubbles are formed in the cover layer which solidify in time due to evaporation of water. At the same time the volume of the cover layer increases substantially. After 4.5 min heating the cover layer containing the bubbles is almost free of water and has a thickness of about 0.4 mm. Subsequently a finish layer of a 20% polyurethane solution containing finely milled pigments is spread as a thin layer having a thickness of about 0.05 mm on the cover layer and is solidified by heating up to 90° C. After the heating of 1.5 min the finish layer adheres strongly to the cover layer.

EXAMPLE 2

A supporting layer of silicone-treated paper having an anti-adhesive finish is covered by a 60% aqueous polyurethane-dispersion containing 2.5% very finely milled pigments. The thickness of this dispersion layer which is applied by spreading by means of a nozzle, is about 0.1 mm. This layer is infrared heated up to 98° C and is dried there in time by directing an air stream onto it. This layer constitutes the finish layer. On it there is then applied a layer having a thickness of about 0.3 mm and containing bubbles. This cover layer consists of 950 g aqueous 60% natural rubber latex, 15 g finely powdered zinc oxide, 12 g colloidal sulfur (both serving as cross linking agents and accelerators) and 53 g bubbles of a copolymer of polyvinylidene chloride. This mixture is applied with a thickness of 0.3 mm on the already dried finish layer by means of a stripper and is dried at 90° C and vulcanized. After 5 min the layer containing the bubbles has been solidified to such an extent that the carrier layer constituted by a woven cotton layer having a fibrous surface can be bonded to the cover layer. For this purpose a polyurethane dispersion is used as an adhesive and is applied in a thin layer on the cotton carrier layer. After drying the adhesive the supporting layer is torn off from the other layers.

As already mentioned, hydrocarbons and chlorinated hydrocarbons can be used as blowing agents. The blowing agent may be encapsulated within a vinylidenechloride-acrylonitrile copolymer. The shell of the bubbles may thus consist of an elastic copolymer of polyvinylidene chloride.

In a further method for preparing a composition layer according to the invention may for example consist in that between 0.3 and 6.5 parts by weight of a finely powdered vinylidene chloride-acrylontrile copolymer having a blowing agent and, respectively, or between 0.3 and 6.5 parts by weight of thermoplastic bubbles of varying diameters, preferably about 1 to 3 parts by weight of each of said materials, are distributed within an elastomer dispersion having a solids content of 60% possibly including auxiliary materials such as cross-linking agents, dyestuffs, coagulating agents, filler materials, thickeners or the like. The mixture thus obtained is distributed as a cover layer in any desired manner with the desired thickness onto a carrier layer, which is preferably hot. Subsequently the spread layer of said dispersion is heated by passing heat only through the carrier layer or by additionally heating from the top side, so that the dispersion will be solidified and additional gas-filled bubbles will be formed when a blowing is used.

In the accompanying drawing a cross section through an inventive composition layer is shown.

The carrier layer 1 consists of leather and carries a cover layer 2 of minor thickness bonded to the carrier layer 1. The cover layer 2 consists of a base material 3 of synthetic resin into which bubbles 4 are embedded. Each bubble 4 has a shell 5 consisting of another synthetic resin material than that of the base material 3 and is filled in its interior 6 with air or another suitable gas. The cover layer 2 is covered by a thin finish layer 7 of synthetic plastic material adhering to the cover layer 2.

The layers 1, 2 and 7 have together a thickness of about 1.5 mm and the ratio of thicknesses of the layers 1, 2 and 7 is about 35:16:1.

What I claim is:

1. A composite leather multilayer structure for shoe material and the lime comprising a natural leather carrier layer and a cover layer bonded to said leather carrier layer and consisting of a polyurethane synthetic-resin matrix having bubbles of diameters of substantially 0.009 to 0.6 mm distributed therein, said bubbles each being elastically deformable and having a shell of polyvinylidene chloride copolymer synthetic-resin thermoplastic material and enclosing a gas-filled space, said gas-filled spaces constituting 50 to 85% of the total volume of said cover layer, said cover layer having a surface remote from said carrier layer forming a leather-like pattern.

2. The multilayer structure defined in claim 1 wherein said diameters are in the range of 0.01 to 0.06 mm.

3. The multilayer structure defined in claim 1 wherein said bubbles are only loosely bonded to said matrix.

4. The multilayer structure defined in claim 3, further comprising a layer of an antibonding agent along the outer surfaces of said bubbles for resisting bonding between said shells and said matrix.

5. The multilayer structure defined in claim 4 wherein said antibonding agent is selected from the group which consists of polysiloxanes, fatty acids and fatty alcohols.

6. The multilayer structure defined in claim 1 wherein the proportion of said spaces in a surface region of said cover layer is greater than that in a central region thereof.

7. The multilayer structure defined in claim 1 wherein said surface is formed with a finishing layer.

* * * * *